May 19, 1964
H. G. LANG
3,133,614
SELF-ENERGIZING DISC BRAKE
Filed Oct. 23, 1961
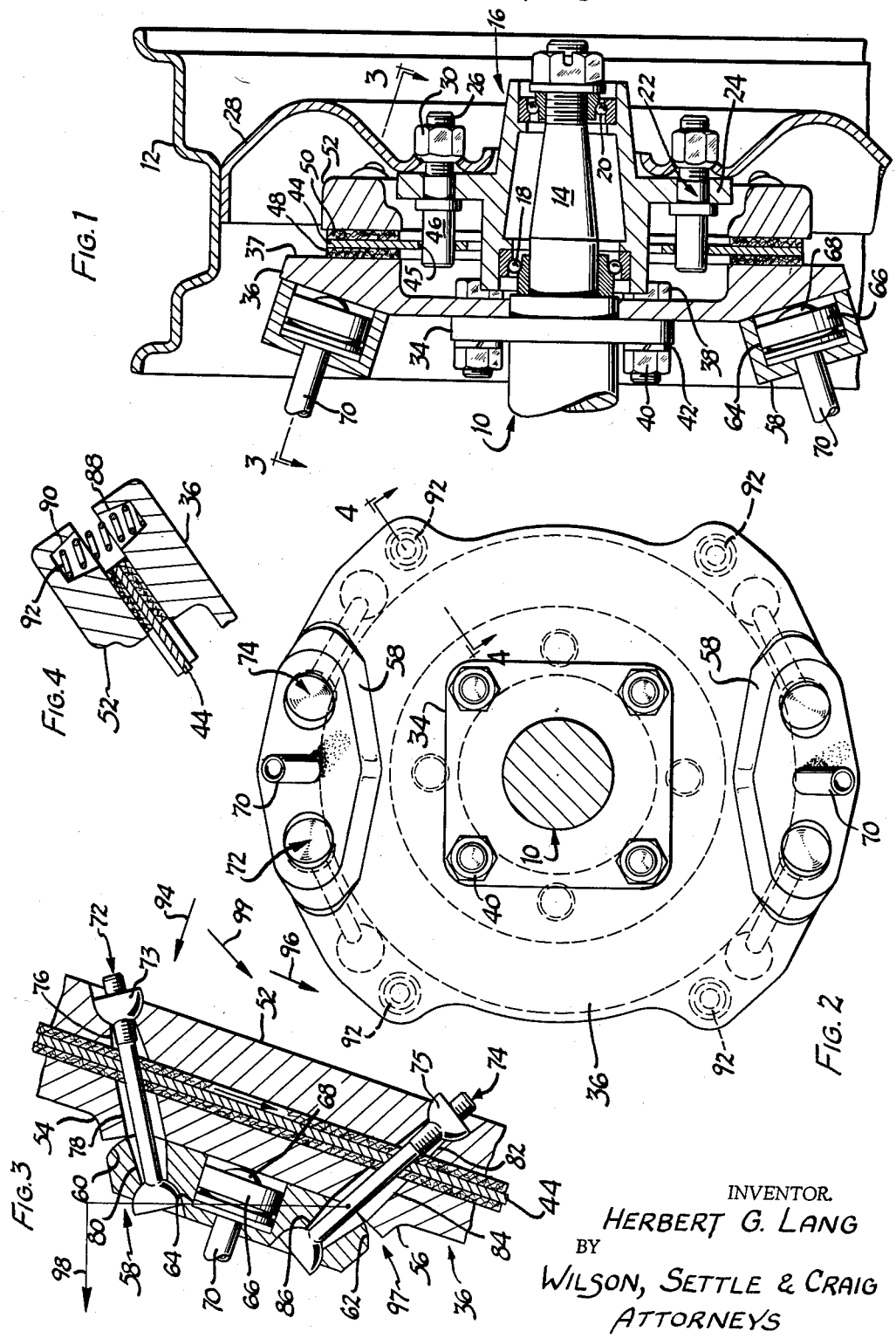
INVENTOR.
HERBERT G. LANG
BY
WILSON, SETTLE & CRAIG
ATTORNEYS

United States Patent Office 3,133,614
Patented May 19, 1964

3,133,614
SELF-ENERGIZING DISC BRAKE
Herbert G. Lang, Garden City, Mich., assignor to Ford Motor Company, Dearborn, Mich., a corporation of Delaware
Filed Oct. 23, 1961, Ser. No. 146,817
6 Claims. (Cl. 188—73)

This invention relates to braking devices, and more particularly to disc brakes of the self-energizing type.

In the art of vehicle manufacture, larger and heavier vehicles have been developed which travel at higher speeds on smaller wheels. This is true in the automotive field and in the aircraft industry as well. Thus, the space in which braking mechanisms are housed has become smaller while the requirement for higher energy absorption per unit of size has increased.

In the art of producing braking devices for vehicles such as automobiles, aircraft, tractors, trailers and the like, constant efforts have been made since early days to make the braking action more positive and to require less effort on the part of the operator of the vehicle. Thus, brakes of the self-energizing type have been evolved and found to be practical in that they require less mechanical advantage from the operator's front pedal to the brake mechanism. However, the self-energizing action is obtained at the expense of having more erratic performance as the result of frictional changes than a brake of the non-energized type.

A brake of the self-energizing type is characterized by the fact that when a vehicle operator applies a certain amount of braking force as through a foot pedal or the like, the brake mechanism at the wheel actually becomes self-energizing to a degree. Thus, the brake itself supplements the pressure application by the operator so that a nominal amount of braking force effected by the operator is converted into a substantially larger braking force.

As efforts to improve brakes have continued, the disc brake has also evolved, and some of these have been of the self-energizing type. However, the prior disc brakes in general have been characterized by complex designs requiring costly components and assembly time, with accompanying high service and replacement costs. Also, in many instances the prior disc brakes could not be fitted into an allotted space and have sufficient capacity to do the job.

Because of the foregoing reasons, disc brakes have not come into very wide application. Accordingly, if a simplified, high capacity disc brake of the self-energizing type could be provided that would fit present-day space requirements and that would provide positive and controlled self-energization, with sufficient capacity for high energy absorption, a substantial step forward in the art of brake manufacture would be provided.

It is accordingly an important object of the present invention to provide a novel disc brake.

A further object is to provide a novel disc brake of the self-energizing type.

A still further object is to provide a novel self-energizing disc brake utilizing a fixed pressure plate, a rotatable brake disc and a movable pressure plate adapted to bear against the brake disc and be self-energized by contact therewith, through a unique twin-linkage system utilizing a rocking cylinder block operating against the fixed pressure plate.

Another object is to provide a disc brake of the self-energizing type wherein a movable pressure plate is adapted to be compressed against a rotating disc by friction between the disc and the pressure plate and through a pair of canted links cooperating with a rocking hydraulic cylinder. The links pivot in cooperation with the hydraulic cylinder block to provide a helical pull of the movable plate in against the disc and also force the disc against the fixed plate to provide a positive, controlled, self-energizing braking action.

A further object is to provide a simplified disc brake of the self-energizing type having a fixed pressure plate with an annular braking surface cooperating with an annular brake disc and a movable pressure plate having an annular braking surface also cooperating with the annular brake disc.

Other objects of this invention will appear in the following description and appended claims, reference being had to the accompanying drawings forming a part of this specification wherein like reference characters designate corresponding parts in the several views.

In the drawings:

FIGURE 1 is an axial section view of a disc brake made in accordance with the present invention;

FIGURE 2 is a rear elevational view of the device as shown in FIGURE 1;

FIGURE 3 is a section view taken along the lines 3—3 of FIGURE 1, looking in the direction of the arrows; and FIGURE 4 is a section view taken along the line 4—4 of FIGURE 2, looking in the direction of the arrows.

*Perspective View*

Briefly, the present invention relates to an improved disc brake of a simplified, inexpensive, easily serviceable construction. In accordance with the present invention a fixed pressure plate that has an annular friction surface is carried by a wheel axle. A rotatable annular brake disc is supported on the wheel hub for axial movement thereon. A movable pressure plate, also having an annular braking surface for engaging the disc is positioned adjacent the disc opposite the fixed pressure plate. By a novel arrangement of two pairs of cooperating linkages, being connected at their ends to the movable pressure plate and to a hydraulic cylinder block carried by the fixed pressure plate respectively, the movable pressure plate is adapted to be drawn in against the brake disc in a self-actuating manner upon application of partial braking force.

The hydraulic cylinder block carrying the inner ends of the link pairs is fitted with a piston that is adapted to abut the fixed pressure plate and pull the links and the movable pressure plate into braking engagement with the disc and fixed pressure plate. The hydraulic cylinder block is so constructed that it is adapted to rock in a unique manner about pivot points formed between it and the fixed pressure plate to permit a slight helical movement of the movable pressure plate and thereby provide the self-energizing braking action.

*The Environment*

As best shown in FIGURE 1, the self-energizing disc brake of the present invention is applied to an axle assembly 10, which, within the broad scope of the invention, represents any wheel-supporting axle such as used on automobiles. The axle assembly 10 illustrated, typifies that of an automobile front wheel and includes a spindle 14 of stepped configuration, and is adapted to rotatably journal a wheel hub 16. The wheel hub 16 is of annular configuration and anti-friction bearings, such as ball bearings, are provided at 18 and 20 for supporting the wheel hub 16 in rotatable relationship upon the stepped spindle 14.

Also, as best shown in FIGURE 1, the wheel hub 16 is provided with a plurality of pins 22 that are press fitted into apertures in a flange 24 of the wheel hub 16. Each pin 22 has a threaded terminal portion 26. A wheel disc 28, provided with suitable apertures to fit upon the portion 26 of pins 22, is retained in position on the rotatable hub 16 with suitable nuts 30. The wheel disc 28 carries a rim 12 and a tire (not shown) on its outer periphery.

The Invention

On the axle 10, there is provided a supporting flange 34. A fixed pressure plate 36 of generally annular configuration, as shown in FIGURE 2, is provided with four spaced apertures (not shown) to receive bolts 38 to which are secured nuts 40 and lock washers 42 whereby the fixed pressure plate 36 is secured to the supporting flange 34.

An annular brake disc 44 is provided adjacent its inner periphery with apertures 45 whereby it is adapted to be slidably fitted upon the inner end portions 46 of the pins 22 carried by the flange 24 of the wheel hub 16. The brake disc 44 is provided on each side with annular configurations of frictional braking material 48 and 50 and the annulus 48 of frictional brake material is adapted to engage an annular friction surface of corresponding configuration formed on the exposed face 37 of the fixed pressure plate 36. Also, the annulus 50 of frictional brake material is adapted to engage an annular braking surface formed upon a movable pressure plate 52, now to be described.

The movable pressure plate 52, as best shown in FIGURES 1 and 3, is supported from the fixed pressure plate 36 by a unique linkage system including a hydraulic cylinder block, forming an important aspect of the invention. Thus, as shown in FIGURE 3, the back side of the fixed pressure plate 36 is provided with a pair of spaced abutments 54 and 56 that are adapted to cooperate and coact with a hydraulic cylinder block 58. As shown in FIGURES 2 and 3, the hydraulic cylinder block 58 is of elongated flattened configuration that may be generally oval, as shown, or if desired, generally rectangular, and is provided at each end with rounded, canted surfaces 60 and 62, which are adapted to cooperate with the spaced abutments 54 and 56 of the fixed pressure plate 36.

The cylinder block 58 is provided with a cylinder 64 in which is fitted a piston 66, having a rounded portion in the form of an abutment 68 thereon that is adapted to engage the back side of the fixed pressure plate 36. The back of the cylinder block 58 is provided with an aperture leading into the cylinder 64 and a tubular conduit 70 is connected thereto for admitting pressurized fluid into the cylinder for actuating the piston.

The relationship of the linkage structure of the present invention to the fixed and movable pressure plates 36 and 52 and to the brake disc 44 is generally shown in FIGURE 2 and more specifically shown in FIGURE 3. Thus, the linkage structure includes a pair of canted links 72 and 74 that pass through the movable pressure plate 52, the fixed pressure plate 36 and the cylinder block 58 by suitable openings provided therein. As shown in FIGURE 2, however, the links 72 and 74 are positioned outside of the periphery of the disc 44, thus not interfering with the free rotation of the disc.

As best shown in FIGURE 3, the link 72 passes through an opening 76 in the movable pressure plate 52 that is aligned with an opening 78 in the fixed pressure plate 36, also aligned with an opening 80 in the cylinder block 58. Similarly the link 74 passes through an opening 82 in the movable pressure plate 52 that is aligned with an opening 84 in fixed pressure plate 36, also aligned with an opening 86 in cylinder block 58.

It will be observed that each end of the canted links 72 and 74 is formed as a semisphere, fitting into a corresponding mating recess formed in the movable pressure plate 52 and the cylinder block 58. By this configuration the pins 72 and 74 and the movable pressure plate 52 and cylinder block 58 can have universal movement with respect to each other.

As shown in FIGURE 3, the outer ends of the links 72 and 74 are in the form of semi-spherical nuts and these fit on threaded terminal portions of the links so that adjustment can be provided to draw the movable pressure plate 52 into proper clearing relationship or adjustment with respect to the brake disc 44 and stationary pressure plate 36.

As shown in FIGURE 4, which is a section view taken along the line 4—4 of FIGURE 2, the fixed pressure plate 36 and the movable pressure plate 52 are provided with spring recesses 88 and 90 which are outside of the periphery of the brake disc 44, and springs 92 are positioned therein to normally bias the movable pressure plate 52 away from the fixed pressure plate 36 so that the brake disc 44 can move therebetween in a freely rotatable manner.

As shown in FIGURE 2, one set of linkages 72 and 74 with a cylinder block 58 and bias springs 92 is provided at the bottom of the brake assembly, and a similar array of parts is provided at the top.

Operation of the Invention

By reference to FIGURE 3, presuming that the piston 66 is in an inoperable state and that the movable pressure plate 52 is biased away from the fixed pressure plate 36 to permit the brake disc 44 to be freely rotatable therebetween, there is a state of matters existing representing a normal unbraked motion of the vehicle wheel. Now, presuming that the brake is to be applied, the operator of the vehicle presses a foot brake to direct fluid through the conduit 70 into the cylinder 64. This action causes the cylinder block 58 to be moved away from the fixed pressure plate 36 and draw the links 72 and 74 with the movable pressure plate 52 in against the rotating disc 44 in the arrow 94 direction.

It can be seen that the cylinder block 58, links 72 and 74, and the movable pressure plate 52 move as a unit in arrow 94 direction until the movable pressure plate 52 engages the brake disc 44. At this point, frictional drag carries the movable pressure plate 52 in arrow 96 direction, and at the same time the cylinder block 58 pivots about the point of contact made between the abutment 68 of piston 66 and the back of the fixed pressure plate 36 until surface 62 of the cylinder block 58 engages the abutment 56 on the fixed pressure plate 36.

At this instant, the self-energizing action of the present invention comes into play. It will be noted that at this point the cylinder block 58 begins to roll up the abutment 56 at point 97, thus directing the movable pressure plate 52 to move in arrow 99 direction through the controlling link 74. The right-hand end of link 72 follows the same motions as the movable pressure plate 52 and the left-hand end of link 72 moves as the recess in the cylinder block 58 directs it, which is essentially in the arrow 98 direction. Thus the combined action of the link 74 and the link diametrically opposite in controlling the movement of the movable pressure plate 52 in the arrow 99 direction actually causes a helical motion of the movable pressure plate in against the brake disc 44. This helical motion is energized by the frictional drag imparted on the movable pressure plate 52 by the brake disc 44, and the resultant self-energizing braking effect substantially supplements the braking force applied by the operator of the vehicle.

As shown in the rear elevational view of FIGURE 2, a pair of links 72 and 74 is provided at the bottom of the unit and a corresponding set of links is provided at the top of the unit in approximately 180° disposition. In combination, the links provide self-energization in either direction of wheel rotation; that is, the brakes are self-energized either when a vehicle is moved forward or when it is moving in a reverse direction. This is clearly contrasted to many prior structures wherein self-energization is provided only in a forward direction of motion of the vehicle to which the brake is attached.

Extended Scope of Invention

While the nuts 73 and 75 on the links 72 and 74 have been disclosed as being on the outside of the movable pressure plate 52, it is to be included within the scope of the invention to place these adjusting nuts on the cylinder block 58 side of the links if desired.

Although the annular disc 44 is shown as being mounted on cylindrical portion 46 of pins 22, it is to be included within the scope of the invention to provide splines on these end portions 46 with corresponding configuration of the apertures of the brake disc 44.

It is also to be included within the scope of the invention to apply the disc brake described herein to all types of automotive vehicles; this would include trucks, tractors and other heavy duty vehicles as well as lighter vehicles of the type of motorbikes, motorcycles and the like. Aircraft wheels also can be fitted with the brake of the present invention.

Also, though not shown, it is to be included within the scope of the invention to shroud or seal the unit or any parts thereof with whatever protective cover may be necessary to protect the unit against the entrance of dust and water or other foreign materials that might affect its normal operation.

While the cylinder blocks 58 are shown as acting against the stationary pressure plate 36, it is to be included within the scope of the invention to place the cylinder blocks on the outside of the movable pressure plate 52, to act against the movable pressure plate.

While two linkage structures as shown in FIGURE 3 are utilized in this brake, it shall be included in the scope of the invention to utilize three or four or more in one brake unit, particularly larger wheel units.

While the linkage structure as shown in FIGURE 3 is shown to operate outside the outer periphery of the brake disc, it is to be included within the scope of this invention to utilize said linkage structure inside the inner periphery of the brake disc while driving the brake disc by its outer periphery by some form of slidable mount such as a spline.

It is also to be included within the scope of the invention to apply the present brake to front and rear axle assemblies of automobiles. In making application to the rear axle assembly where a rotatable axle is carried within an axle housing, of course, the fixed pressure plate is mounted on the axle housing and the disc is carried on the wheel hub, the latter being fastened to or integral with the rotatable axle.

It is also to be included within the scope of the invention to set the links 72 and 74 at different angles with respect to each other depending upon the braking situation that is being applied; that is to the type of vehicle and the amount of self-energization required.

*Advantages of the Invention*

In view of the foregoing description, it will be evident that a novel disc brake of the self-energizing type is provided that is of simplified construction and that provides self-actuation in both directions of wheel rotation.

Further, the unit is provided with a readily accessible adjustment means of extremely simplified configuration, thus facilitating service upon its occasional requirement.

Further, the present invention provides a novel disc brake of the self-energizing type wherein locking and rapid wear are substantially completely obviated.

A further advantage of the disc brake of the present invention is the fact that it utilizes annular friction elements of substantial size, thus contributing to highly efficient braking action and extended life as compared to structures of the prior art using lesser amounts of friction material such as opposed pad structures.

I claim:

1. In a disc brake for a vehicle having an axle assembly and a wheel hub rotatable relative to said axle assembly, a fixed pressure plate carried by said axle assembly, a brake disc mounted on said hub for rotation therewith adjacent said fixed pressure plate, a movable pressure plate adjacent the other side of said brake disc from said fixed pressure plate, a separate fluid cylinder adjacent said fixed pressure plate on the side opposite said disc, a piston carried within said cylinder to engage said fixed pressure plate and force said cylinder away from said fixed pressure plate upon introduction of pressurized fluid into said cylinder, and a pair of links pivotally connected at one end to said fluid cylinder and at the other end to said movable pressure plate, whereby actuation of said pistons is effective to pull said movable pressure plate against said disc and said disc against said fixed pressure plate to stop rotation of said disc.

2. In a disc brake for a vehicle having an axle assembly and a wheel hub rotatable relative to said axle assembly, a fixed pressure plate carried by said axle assembly, a brake disc mounted on said hub for rotation therewith adjacent said fixed pressure plate, a movable pressure plate adjacent the other side of said brake disc from said fixed pressure plate, a pair of links pivotally carried at one end by said movable pressure plate, a separate fluid cylinder positioned adjacent said fixed pressure plate on the side opposite said disc, said fluid cylinder pivotally carrying the other end of said links, and a piston carried within said cylinder to engage said fixed pressure plate and force said cylinder away from said fixed pressure plate upon introduction of fluid into said cylinder, whereby said links pull said movable pressure plate against said disc and said disc against said fixed pressure plate in a helical, self-energizing manner to stop rotation of said disc.

3. In a disc brake for a vehicle having an axle assembly and a wheel hub rotatable relative to said axle assembly, a fixed pressure plate carried by said axle assembly, said fixed pressure plate having an annular braking surface, an annular brake disc mounted on said hub in axially movable relationship toward and away from said fixed pressure plate for intimate frictional engagement with said annular braking surface thereof, a movable pressure plate positioned adjacent the other side of said brake disc from said fixed pressure plate for axial movement toward and away from said disc and said fixed pressure plate, said movable pressure plate having an annular braking surface corresponding to said annular brake disc, a separate fluid cylinder block engageable with said fixed pressure plate on the side opposite said disc, a piston carried by said fluid cylinder to contact said fixed pressure plate upon introduction of fluid into said cylinder and force said fluid cylinder block away from said fixed pressure plate, a pair of canted links extending through said cylinder block, said fixed pressure plate and said movable pressure plate, and said links being pivotally connected at their ends to said cylinder block and said movable pressure plate respectively, whereby actuation of said piston is effective to pull said movable pressure plate against said disc and said disc against said fixed pressure plate to stop rotation of said disc in a self-energizing manner.

4. In a disc brake for a vehicle having an axle assembly and a wheel hub rotatable relative to said axle assembly, a fixed pressure plate carried by said axle assembly, an annular brake disc mounted on said hub in axially movable relationship toward and away from said fixed pressure plate for frictional engagement therewith, a movable pressure plate positioned adjacent the other side of said brake disc from said fixed pressure plate for axial movement toward and away from said disc and said fixed pressure plate, a cylinder block engageable with said fixed pressure plate on the other side thereof opposite said disc, said block having first and second ends, abutments on said fixed pressure plate rockably engageable by the ends of said block, a fluid cylinder in said block opening toward said fixed pressure plate, a piston in said cylinder to contact said fixed pressure plate upon introduction of pressurized fluid into said cylinder, a pair of canted link arms extending respectively through the ends of said block and through said movable pressure plate, universal pivotal connections between the ends of said link arms and said block and said movable pressure plate, means for adjusting the length of said links, and means biasing said fixed pressure plate away from said movable pressure plate.

5. In a disc brake for a vehicle having an axle assembly and a wheel hub rotatable relative to said axle assembly, a fixed pressure plate carried by said axle assembly and having an annular braking surface, an annular brake disc mounted on said hub for rotation therewith adjacent said annular braking surface of said fixed pressure plate, a movable pressure plate adjacent the other side of said brake disc from said fixed pressure plate and having an annular braking surface engageable with the other side of said annular brake disc, a fluid cylinder block engageable with said fixed pressure plate opposite said disc, a cylinder in said block opening toward said fixed pressure plate, a piston within said cylinder and having an abutment thereon engageable with said fixed pressure plate to force said cylinder block away from said fixed pressure plate upon introduction of fluid into said cylinder, and a pair of canted links pivotally connected to said fluid cylinder and to said movable pressure plate.

6. In a disc brake for a vehicle having an axle assembly and a wheel hub rotatable relative to said axle assembly, a fixed pressure plate carried by said axle assembly and having an annular braking surface, an annular brake disc mounted on said hub in axially movable relationship toward and away from said fixed pressure plate for frictional engagement with the annular braking surface thereof, a movable pressure plate positioned adjacent the other side of said brake disc from said fixed pressure plate for axial movement toward and away from said disc and said fixed pressure plate, a separate cylinder block carried adjacent said fixed pressure plate on the other side thereof opposite said disc, said block having first and second ends, ramp surfaces on said fixed pressure plate forming pivot points rockably engageable by the ends of said block, a fluid cylinder in said block opening toward said fixed pressure plate, a piston in said cylinder adapted to contact said fixed pressure plate upon introduction of pressurized fluid into said cylinder to force said block away from said fixed pressure plate, a pair of canted link arms extending respectively through the ends of said block, and through said movable pressure plate, ball connections between the ends of said link arms and said block and said movable pressure plate respectively, means for adjusting the length of said link arms, and means biasing said fixed pressure plate away from said movable pressure plate.

References Cited in the file of this patent

UNITED STATES PATENTS

| 2,655,229 | Eksergian | Oct. 13, 1953 |
| 2,784,811 | Butler | Mar. 12, 1957 |
| 2,963,116 | Peras | Dec. 6, 1960 |
| 2,976,956 | Behles | Mar. 28, 1961 |

FOREIGN PATENTS

| 565,708 | Belgium | Mar. 31, 1958 |
| 654,894 | Great Britain | July 4, 1951 |